United States Patent
Takahashi

(10) Patent No.: US 11,764,535 B2
(45) Date of Patent: Sep. 19, 2023

(54) METHOD FOR MANUFACTURING POWER DISTRIBUTION MEMBER, AND POWER DISTRIBUTION MEMBER

(71) Applicant: Hitachi Metals, Ltd., Tokyo (JP)

(72) Inventor: Noriyuki Takahashi, Tokyo (JP)

(73) Assignee: Proterial, Ltd., Tokyo (JP)

(*) Notice: Subject to any disclaimer, the term of this patent is extended or adjusted under 35 U.S.C. 154(b) by 56 days.

(21) Appl. No.: 17/587,082

(22) Filed: Jan. 28, 2022

(65) Prior Publication Data

US 2022/0247142 A1 Aug. 4, 2022

(30) Foreign Application Priority Data

Feb. 2, 2021 (JP) .................................. 2021-014994

(51) Int. Cl.
*H01R 4/00* (2006.01)
*H01R 43/28* (2006.01)
*H01R 4/18* (2006.01)
*H01R 43/048* (2006.01)

(52) U.S. Cl.
CPC ............. *H01R 43/28* (2013.01); *H01R 4/184* (2013.01); *H01R 43/0484* (2013.01)

(58) Field of Classification Search
CPC ........ H05K 1/0206; H01R 4/18; H01R 4/187; H01R 4/184
See application file for complete search history.

(56) References Cited

U.S. PATENT DOCUMENTS

| | | | |
|---|---|---|---|
| 6,268,832 B1* | 7/2001 | Twort | H01Q 1/1278 343/711 |
| 9,419,491 B2 | 8/2016 | Egami et al. | |
| 10,164,495 B2* | 12/2018 | Hamana | H02K 3/50 |
| 10,348,149 B2* | 7/2019 | Baba | H02K 5/225 |
| 10,587,058 B2* | 3/2020 | Kurono | H01R 13/405 |
| 11,411,454 B2* | 8/2022 | Kitora | H02K 3/52 |
| 2014/0306561 A1* | 10/2014 | Egami | H02K 3/12 310/71 |

FOREIGN PATENT DOCUMENTS

JP 2014-207827 A 10/2014

* cited by examiner

*Primary Examiner* — Phuong Chi Thi Nguyen
(74) *Attorney, Agent, or Firm* — Calderon Safran & Cole, P.C.; Thomas W. Cole

(57) ABSTRACT

A method for manufacturing a power distribution member includes preparing a solid wire with a circular cross-sectional shape, pressing to a portion of the solid wire in a pressing direction orthogonal to the solid wire to cause plastic deformation, thereby forming a pair of small curvature surfaces on an outer circumference of the solid wire on both sides in the pressing direction, the small curvature surfaces having a smaller curvature than an outer circumferential surface of the solid wire before the pressing and facing the pressing direction, preparing a terminal metal piece including a pair of facing walls facing each other and a coupling wall coupling between ends of the pair of facing walls, inserting the solid wire after the pressing between the pair of facing walls of the terminal metal piece in such a manner that one of the pair of small curvature surfaces faces one of the pair of facing walls and the other of the pair of small curvature surfaces faces the other of the pair of facing walls, and, after the inserting, crimping the pair of facing walls onto the solid wire.

8 Claims, 10 Drawing Sheets

METHOD FOR MANUFACTURING POWER DISTRIBUTION MEMBER, AND POWER DISTRIBUTION MEMBER

CROSS-REFERENCE TO RELATED APPLICATIONS

The present patent application claims the priority of Japanese patent application No. 2021-014994 fled on Feb. 2, 2021, and the entire contents thereof are hereby incorporated by reference.

TECHNICAL FIELD

The present invention relates to a method for manufacturing a power distribution member, and a power distribution member.

BACKGROUND ART

Patent Literature 1 discloses a connection member for motor, which connects between a motor winding and a terminal block. The connection member for motor in the second and third embodiments of Patent Literature 1 includes a solid wire (i.e., single wire) with a circular cross-sectional shape covered with an insulating member and a crimp terminal crimped to an end of the solid wire exposed from the insulating member.

CITATION LIST

Patent Literature

Patent Literature 1: JP 2014-207827A

SUMMARY OF THE INVENTION

In the connection member for motor described in Patent Literature 1, a contact area between the crimp terminal and the solid wire is likely to become small since the crimp terminal is crimped to the solid wire with a circular cross-sectional shape, hence, there is room for improvement from the viewpoint of improving connection strength between the crimp terminal and the solid wire.

The invention was made in view of such circumstances and it is an object of the invention to provide a method for manufacturing a power distribution member capable of providing improved connection strength between a solid wire and a terminal metal piece (i.e., terminal fitting), and also to provide a power distribution member.

So as to achieve the above object, one aspect of the invention provides: a method for manufacturing a power distribution member, comprising:

preparing a solid wire with a circular cross-sectional shape;

pressing to a portion of the solid wire in a pressing direction orthogonal to the solid wire to cause plastic deformation, thereby forming a pair of small curvature surfaces on an outer circumference of the solid wire on both sides in the pressing direction, the small curvature surfaces having a smaller curvature than an outer circumferential surface of the solid wire before the pressing and facing the pressing direction;

preparing a terminal metal piece that comprises a pair of facing walls facing each other and a coupling wall coupling between ends of the pair of facing walls;

inserting the solid wire after the pressing between the pair of facing walls of the terminal metal piece in such a manner that one of the pair of small curvature surfaces faces one of the pair of facing walls and the other of the pair of small curvature surfaces faces the other of the pair of facing walls; and after the inserting, crimping the pair of facing walls onto the solid wire.

Further, so as to achieve the above object, another aspect of the invention provides: a power distribution member, comprising:

a solid wire comprising a circular cross-sectional portion with a circular cross-sectional shape; and a terminal metal piece crimped to the solid wire, wherein the terminal metal piece comprises a pair of facing walls facing each other and sandwiching the solid wire, and a coupling wall coupling between ends of the pair of facing walls, wherein a pair of small curvature surfaces having a smaller curvature than an outer circumferential surface of the circular cross-sectional portion of the solid wire and facing a facing direction of the pair of facing walls are formed on an outer circumference of the solid wire on both sides in the facing direction, and wherein each of the pair of small curvature surfaces is arranged such that a portion is within a facing region of the facing walls and another portion is exposed from the facing region.

Effects of the Invention

According to the invention, it is possible to provide a method for manufacturing a power distribution member capable of providing improved connection strength between a solid wire and a terminal metal piece, and also to provide a power distribution member.

BEST MODE FOR CARRYING OUT THE INVENTION

First Embodiment

The first embodiment of the invention will be described in reference to FIGS. 1 to 15. Note that, embodiments below are described as preferred examples for implementing the invention. Although some part of the embodiments specifically illustrates various technically preferable matters, the technical scope of the invention is not limited to such specific aspects.

Motor Device 10

Figure 1:
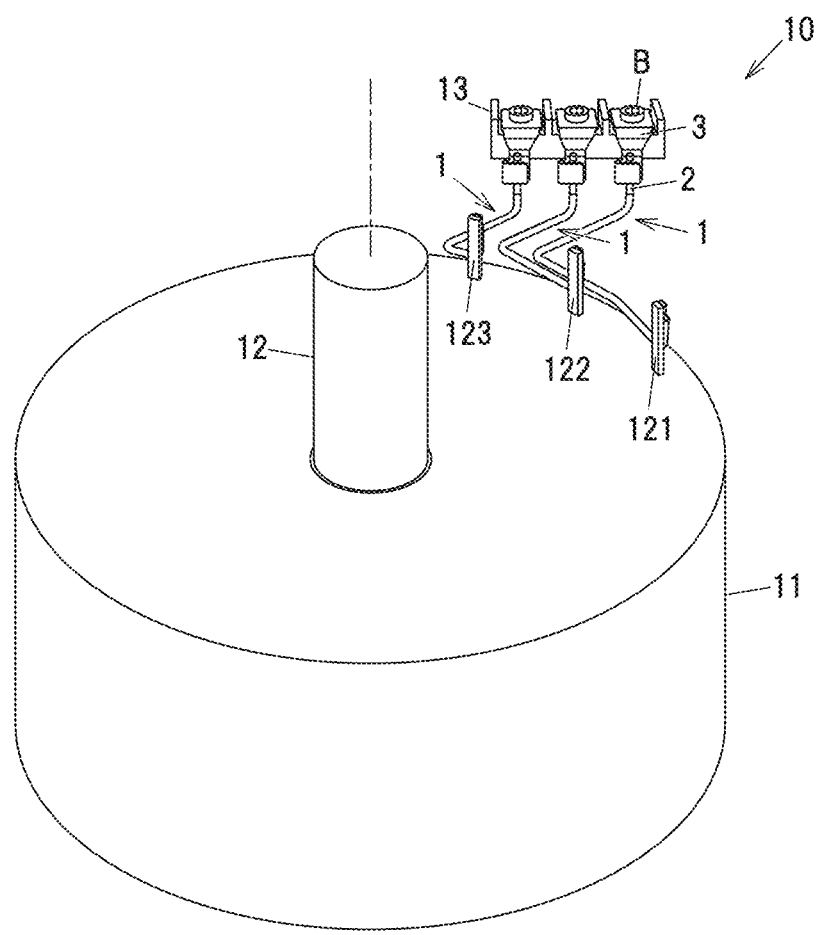
FIG. 1 is a schematic perspective view showing a configuration of a motor device including power distribution members in the first embodiment.

FIG. 1 is a schematic perspective view showing a configuration of a motor device 10 including power distribution members 1 in the first embodiment. The motor device 10 when in use is mounted on a vehicle such as electric vehicle or hybrid vehicle, etc. The motor device 10 is a device to generate a driving force for travel of the vehicle. The motor device 10 includes a motor case 11, a stator and a rotor (not shown) arranged inside the motor case 11, and a shaft 12 that passes through the center of the rotor and is supported so as to be able to rotate integrally with the rotor.

The stator has a stator core (not shown) around which a U-phase winding 121, a V-phase winding 122 and a W-phase winding 123 are wound. A U-phase current of an inverter (not shown) is input to the U-phase winding 121, a V-phase current of the inverter is input to the V-phase winding 122, and a W-phase current of the inverter is input to the W-phase winding 123. Respective end portions of the U-phase winding 121, the V-phase winding 122 and the W-phase winding 123 extend out of the motor case 11. The respective end portions of the U-phase winding 121, the V-phase winding 122 and the W-phase winding 123 are connected to a terminal block 13 via the power distribution members 1. The terminal block 13 is fixed to, e.g., a vehicle body or the motor case 11, etc. At the terminal block 13, three power distribution members 1 are respectively connected to an electrical path to which the U-phase current of the inverter is output, an electrical path to which the V-phase current is output, and an electrical path to which the W-phase current is output. In this regard, the configuration of the motor device 10, except the power distribution members 1, is not limited to that described above and it is possible to adopt a general configuration.

Power Distribution Member 1

The power distribution member 1 includes a solid wire 2 and a terminal metal piece (i.e., terminal fitting) 3 crimped to the solid wire 2. The terminal metal piece 3 is crimped to one end of the solid wire 2, and the U-phase winding 121, the V-phase winding 122 or the W-phase winding 123 is connected to the other end of the solid wire 2. Hereinafter, one side in an extending direction of the solid wire 2 where the terminal metal piece 3 is crimped is referred to as a solid-wire distal-end side (solid-wire tip side), and the other side where the U-phase winding 121, the V-phase winding 122 or the W-phase winding 123 is connected is referred to as a solid-wire proximal-end side (solid-wire base side).

Next, a structure of the power distribution member 1 will be described along with an example of a procedure of a method for manufacturing the power distribution member 1. The method for manufacturing the power distribution member 1 in the first embodiment includes a solid wire preparation step, a pressing step, a terminal preparation step, and an insertion step.

Figure 2:
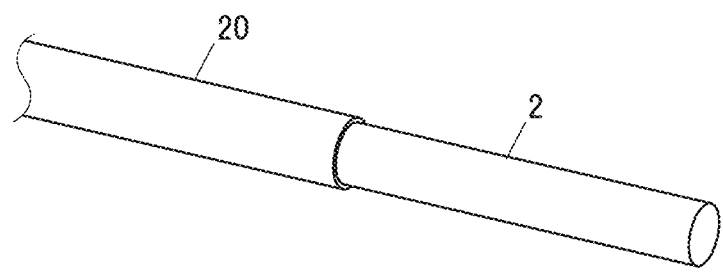
FIG. 2 is a perspective view showing a solid wire prepared in a solid wire preparation step in the first embodiment.

FIG. 2 is a perspective view showing the solid wire 2 prepared in the solid wire preparation step. The solid wire preparation step is a step of preparing the solid wire 2 with a circular cross-sectional shape. In this regard, when describing the solid wire 2, the term "cross section" means a cross section of the solid wire 2 orthogonal to the extending direction of the solid wire 2, unless otherwise specified. The solid wire 2 can be, e.g., a conductive wire made of a conductive member such as copper with tin-plated surface. In the first embodiment, the solid wire 2 is a single conductive wire with a diameter of not less than 1 mm and not more than 5 mm. In the first embodiment, the solid wire 2, except both end portions, is covered with an insulation covering 20 having electrical insulating properties.

Figure 3:
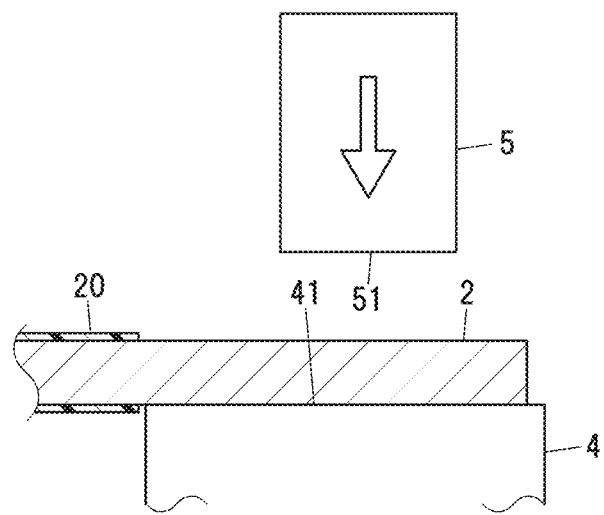
FIG. 3 is a diagram illustrating a pressing step in the first embodiment in a state before the solid wire is pressed.
Figure 4:
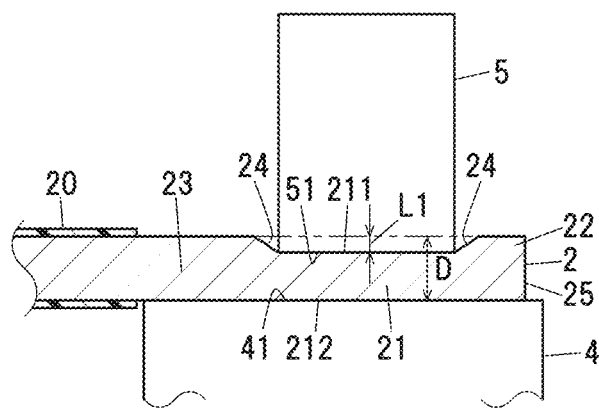
FIG. 4 is a diagram illustrating the pressing step in the first embodiment in a state after the solid wire is pressed.
Figure 5:
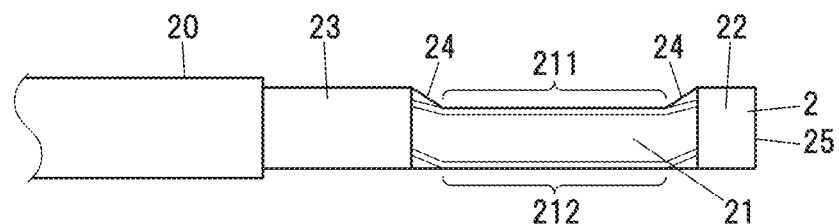
FIG. 5 is a side view showing the solid wire after the pressing step.
Figure 6:
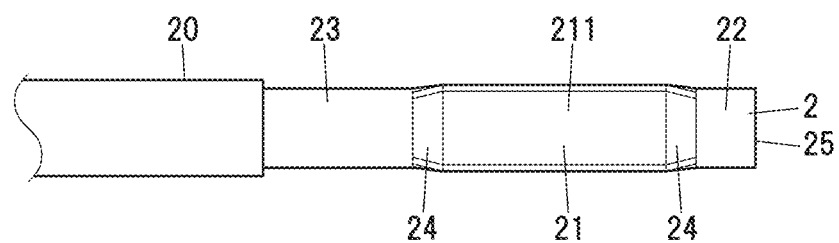
FIG. 6 is a plan view showing the solid wire after the pressing step in the first embodiment.

After the solid wire preparation step, the pressing step of pressing and plastically deforming an end portion of the solid wire 2 on the solid-wire distal-end side is performed. FIG. 3 is a diagram illustrating the pressing step in a state before the solid wire 2 is pressed. FIG. 4 is an explanatory diagram illustrating the pressing step in a state after the solid wire 2 is pressed. FIG. 5 is a side view showing the solid wire 2 after the pressing step. FIG. 6 is a plan view showing the solid wire 2 after the pressing step.

In the pressing step, the solid wire 2 is plastically worked by a mounting table 4 and a pressing tool 5, as shown in FIG. 3. The mounting table 4 includes, on one side, a flat mounting surface 41 on which the solid wire 2 is placed. The pressing tool 5 includes a flat pressing surface 51 parallel to the mounting surface 41, and the solid wire 2 is plastically deformed by pushing the pressing surface 51 against the solid wire 2. A length of the pressing surface 51 in a longitudinal direction of the solid wire 2 arranged between the mounting surface 41 and the pressing surface 51 (i.e., in a left-right direction of FIG. 3) is smaller than that of the mounting surface 41.

In the pressing step, the solid wire 2 exposed from the insulation covering 20 on the solid-wire distal-end side is substantially entirely placed on the mounting surface 41. At this time, the solid wire 2 is placed on the mounting surface 41 in such a manner that an end portion on the solid-wire distal-end side protrudes from a facing region of the mounting surface 41 and the pressing surface 51. Then, by moving the pressing surface 51 of the pressing tool 5 in a pressing direction that is orthogonal to the pressing surface 51 (i.e., in a direction indicated by an arrow in FIG. 3), the solid wire 2 is pushed toward the mounting surface 41 and is plastically deformed, as shown in FIGS. 3 and 4.

As shown in FIGS. 4 to 6, a pair of small curvature surfaces 211, 212, to which shapes of the mounting surface 41 and the pressing surface 51 are transferred, are formed on the solid wire 2 by the pressing step. The small curvature surfaces 211, 212 are surfaces that have a smaller curvature than an outer circumferential surface of the solid wire 2 before being pressed and face the pressing direction in the pressing step. The surface facing the pressing direction in the pressing step means, e.g., a surface in which an angle formed between the pressing direction and a normal direction to any part of the surface is not more than 30°, preferably not more than 15°. The small curvature surfaces 211, 212 are substantially flat surfaces, or curved surfaces, etc., with a smaller curvature than the outer circumferential surface of the solid wire 2 before being pressed, and the small curvature surfaces 211, 212 in the first embodiment are substantially flat surfaces. The pair of the small curvature surfaces 211, 212 are formed in substantially the same region in the extending direction of the solid wire 2.

Hereinafter, of the pair of the small curvature surfaces 211, 212, the surface to which the shape of the pressing surface 51 is transferred is referred to as the first small curvature surface 211, the surface to which the mounting surface 41 is transferred is referred to as the second small curvature surface 212, and these surfaces are referred to as the small curvature surfaces 211, 212 when not specifically distinguished. In addition, a portion of the solid wire 2 in the extending direction thereof, which is arranged in the facing region of the mounting surface 41 and the pressing surface 51 and is pressed by the pressing surface 51, is referred to as a compressed wire portion 21. The compressed wire portion is a portion of the solid wire 2 having the pair of small curvature surfaces 211, 212 on both sides in the pressing direction.

As shown in FIG. 4, the first small curvature surface 211 is formed by being squashed with the pressing surface 51 and is recessed toward the second small curvature surface 212 relative to an outer circumferential surface of the compressed wire portion 21 before being pressed (a portion indicated by a phantom line). A largest length L in the pressing direction between a portion to be the first small curvature surface 211 on the outer circumferential surface of the solid wire 2 before being pressed (the portion indicated by the phantom line) and the first small curvature surface 211 after being pressed (i.e., the largest recess depth) is preferably not less than 10% and not more than 40%, more preferably not less than 15% and not more than 30%, of a diameter D of the solid wire 2 before being pressed.

The second small curvature surface 212 is extended flat by being pushed against the mounting surface 41 and is formed at a position equivalent to a position of an edge, on the mounting surface 41 side in the pressing direction, of the compressed wire portion 21 having a shape before being pressed. In addition, as shown in FIG. 6, the compressed wire portion 21 protrudes more on both sides in a width direction of the compressed wire portion 21 than the state before being pressed, by the amount compressed in the pressing direction by the pressing step.

The pair of small curvature surfaces 211, 212 are formed at a position distant in the extending direction of the solid wire 2 from a tip 25 of the solid wire 2. That is, the compressed wire portion 21 having the pair of small curvature surfaces 211, 212 is formed on a middle portion of the solid wire 2 excluding both ends of the solid wire 2, and a pair of circular cross-sectional portions 22, 23 are formed on both sides of the compressed wire portion 21. Of the pair of circular cross-sectional portions 22, 23, the circular cross-sectional portion 22 is located on the solid-wire distal-end side and the circular cross-sectional portion 23 is located on the solid-wire proximal-end side. The circular cross-sectional portions 22, 23 are portions of the solid wire 2 which are not pressed and thus not deformed in the pressing step. The first small curvature surface 211 and respective outer circumferential surfaces of the circular cross-sectional portions 22, 23 are connected by inclined surfaces 24 that are inclined along the extending direction of the solid wire 2 toward a direction opposite to the facing direction of the first small curvature surface 211. The inclined surfaces 24 are surfaces that are not pressed by the pressing tool 5 in the pressing step but are formed due to formation of the first small curvature surface 211 in the pressing step. In this regard, the pair of small curvature surfaces 211, 212 are formed at a position not less than 1.0 mm distant from the insulation covering 20 in the extending direction of the solid wire 2. Thus, when the crimping step (described later) is performed by, e.g., thermal crimping (fusing, etc.), melting and deformation of an end portion of the insulation covering 20 by heat during thermal crimping can be suppressed.

Figure 7:
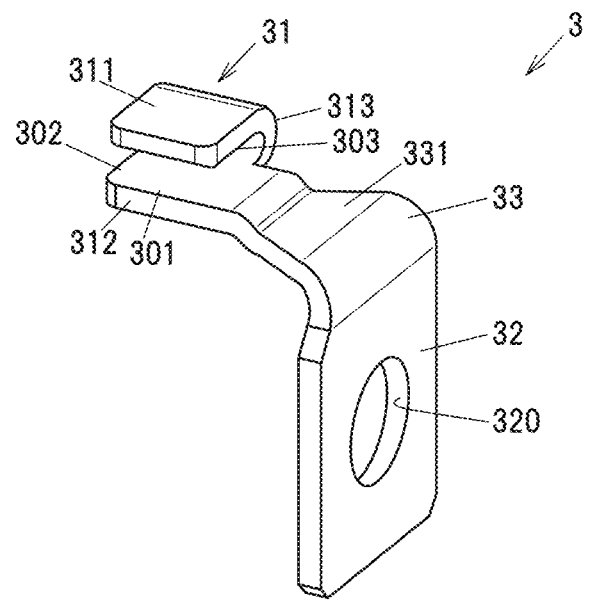
FIG. 7 is a perspective view showing a terminal metal piece prepared in a terminal preparation step in the first embodiment.
Figure 8:
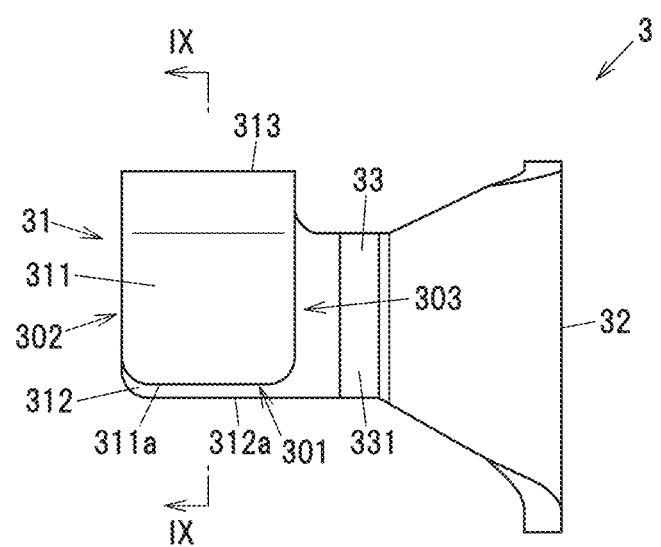
FIG. 8 is a plan view showing the terminal metal piece prepared in the terminal preparation step in the first embodiment.
Figure 9:
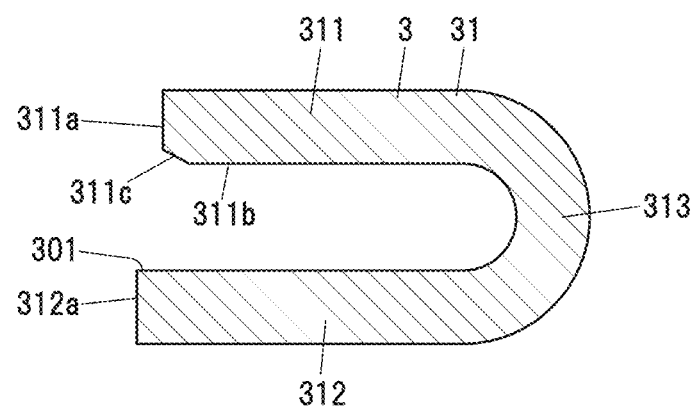
FIG. 9 is a cross-sectional view taken along line IX-IX of FIG. 8 and viewed in an arrow direction.

Then, the terminal metal piece 3 to which the solid wire 2 is fixed is prepared in the terminal preparation step. FIG. 7 is a perspective view showing the terminal metal piece 3 prepared in the terminal preparation step. FIG. 8 is a plan view showing the terminal metal piece 3 prepared in the terminal preparation step. FIG. 9 is a cross-sectional view taken along line IX-IX of FIG. 8 and viewed in an arrow direction.

The terminal metal piece 3 is manufactured by, e.g., stamping out a conductive flat plate with a predetermined shape and bending it. The terminal metal piece 3 can be, e.g., a conductive member such as copper with tin-plated surface. The terminal metal piece 3 has a solid wire crimping portion 31 to be crimped to the solid wire 2, a terminal block fixing portion 32 to be bolted to the terminal block 13, and a connecting portion 33 connecting the solid wire crimping portion 31 to the terminal block fixing portion 32.

The solid wire crimping portion 31 is formed by bending a portion of the conductive flat plate constituting the terminal metal piece 3, which is a portion to be the solid wire crimping portion 31, into a U-shape, and has a pair of facing walls 311, 312 facing each other, and an arc-shaped coupling wall 313 coupling between end portions of the pair of facing walls 311, 312. The first facing wall 311, which is one of the pair of facing walls 311, 312, is not connected to the connecting portion 33. Meanwhile, the second facing wall 312, which is the other of the pair of facing walls 311, 312, is connected to the connecting portion 33. Facing surfaces of the pair of facing walls 311, 312 are flat surfaces parallel to each other.

The solid wire crimping portion 31 has a first opening 301, a second opening 302 and a third opening 303. The first opening 301 is an opening formed at an end of the solid wire crimping portion 31 on the opposite side to the coupling wall 313. The second opening 302 and the third opening 303 are openings formed respectively on both sides of the solid wire crimping portion 31 in a direction orthogonal to an opening direction of the first opening 301 and to a facing direction of the pair of facing walls 311, 312. The third opening 303 is an opening closer to the connecting portion 33 than the second opening 302.

Each of the pair of facing walls 311, 312 is formed in a plate shape which is substantially a rectangular shape when viewed in the facing direction of the pair of facing walls 311, 312 and has a thickness in the facing direction. As shown in FIGS. 8 and 9, an end face 311a of the first facing wall 311 located on the far side from the coupling wall 313 is formed at a position on the coupling wall 313 side relative to an end face 312a of the second facing wall 312 located on the far side from the coupling wall 313.

As shown in FIG. 9, a corner of the first facing wall 311 between the end face 311a located on the far side from the coupling wall 313 and a surface 311b located on the second facing wall 312 side is chamfered and a guide surface 311c is thereby formed. The guide surface 311c is a surface serving as a guide when inserting the solid wire 2 between the pair of facing walls 311, 312 in the insertion step described later.

The terminal block fixing portion 32 and the connecting portion 33 of the terminal metal piece 3 are bent from the second facing wall 312 toward a side of the second facing wall 312 distant from the first facing wall 311. The terminal block fixing portion 32 is formed in a plate shape with a thickness in an opening direction of the second opening 302 and the third opening 303. The terminal block fixing portion 32 has a bolt insertion hole 320 formed through the middle portion to allow for insertion of a bolt and is fixed to the terminal block 13 with a bolt B (see FIG. 1). The connecting portion 33 connects the second facing wall 312 of the solid wire crimping portion 31 to the terminal block fixing portion 32. An end portion of the connecting portion 33 on the second facing wall 312 side is configured such that a surface on the first facing wall 311 side is formed as a flank surface 331 that is one step lower toward the side distant from the first facing wall 311, as shown in FIG. 7.

Figure 10:
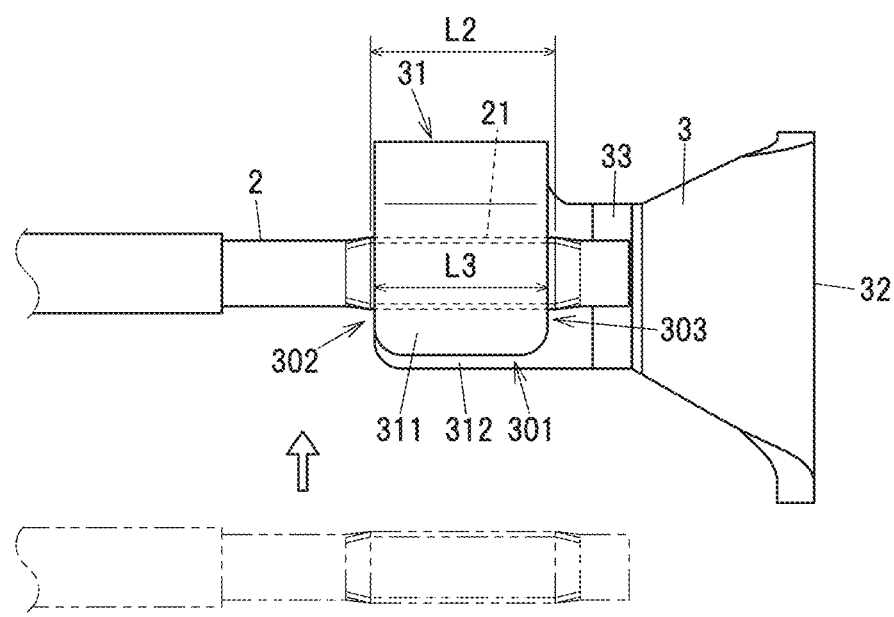
FIG. 10 is an explanatory plan view showing the solid wire and the terminal metal piece in an insertion step in the first embodiment.
Figure 11:
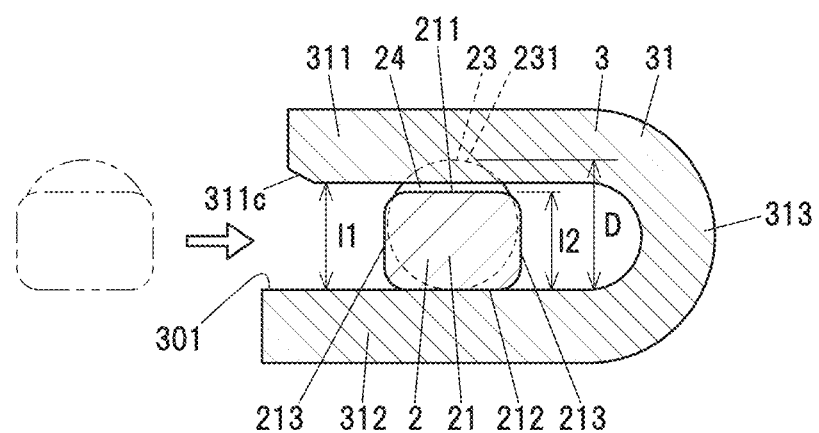
FIG. 11 is an explanatory cross-sectional view showing the solid wire and the terminal metal piece in the insertion step in the first embodiment.
Figure 12:
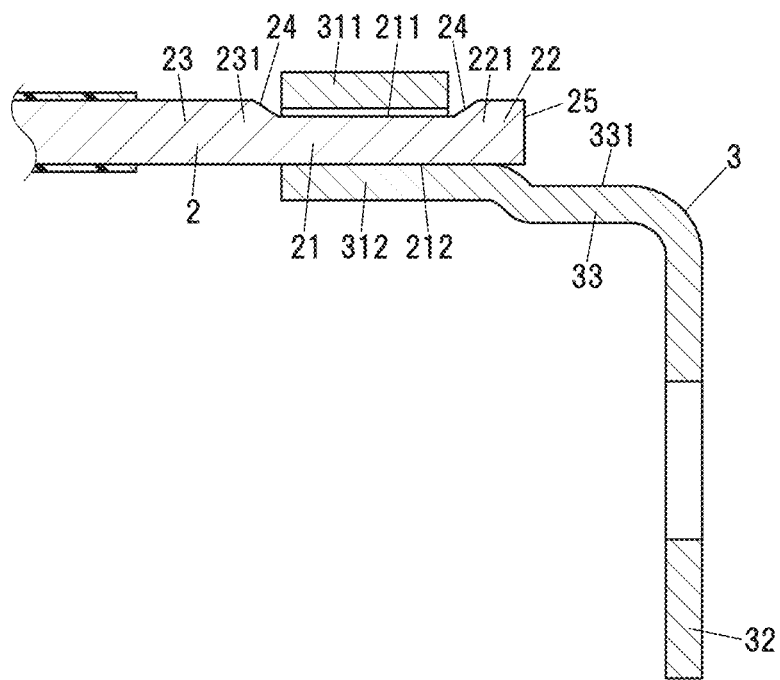
FIG. 12 is a cross-sectional view showing the solid wire and the terminal metal piece after the insertion step in the first embodiment.

Then, the insertion step is performed after the pressing step. That is, in the first embodiment, the compressed wire portion 21 having the pair of small curvature surfaces 211, 212 is formed on the solid wire 2 beforehand in the pressing step, and the compressed wire portion 21 of the solid wire 2 is then inserted and arranged in the solid wire crimping portion 31 of the terminal metal piece 3 in the insertion step. FIG. 10 is an explanatory plan view showing the solid wire 2 and the terminal metal piece 3 in the insertion step. FIG. 11 is an explanatory cross-sectional view showing the solid wire 2 and the terminal metal piece 3 in the insertion step. In FIG. 11, the insulation covering (see 20 in FIGS. 2 to 6, etc.) is not shown for convenience. In addition, side surfaces 213 of the compressed wire portion 21 on both sides in the opening direction of the first opening 301 (i.e., the left-right direction of FIG. 11) are flat surfaces orthogonal to this opening direction in FIG. 11, but may be, e.g., curved surfaces (arc surfaces) along the outer circumferential surface of the solid wire 2 before being pressed. FIG. 12 is a cross-sectional view showing the solid wire 2 and the terminal metal piece 3 after the insertion step.

In the insertion step, the solid wire 2 is moved in a width direction of the compressed wire portion 21 (i.e., a direction indicated by an arrow in FIGS. 10 and 11) and is thereby inserted between the pair of facing walls 311, 312 of the terminal metal piece 3 through the first opening 301. In the insertion step, insertion work is facilitated by inserting the compressed wire portion 21 between the pair of facing walls 311, 312 along the guide surface 311c.

Here, as shown in FIG. 10, a length L2 of the compressed wire portion 21 in a longitudinal direction of the compressed wire portion 21 is larger than a length L3 of a facing region of the pair of facing walls 311, 312 in the opening direction of the second opening 302 and the third opening 303. Furthermore, as shown in FIG. 11, a smallest distance l1 between the pair of facing walls 311, 312 in the facing direction of the pair of facing walls 311, 312 is larger than a largest distance l2 between the pair of small curvature surfaces 211, 212 in an alignment direction of the pair of small curvature surfaces 211, 212 (i.e., the largest thickness of the compressed wire portion 21) and is smaller than the diameter D of the circular cross-sectional portions 22, 23. Therefore, in the insertion step, it is not necessary to, e.g., stretch out the solid wire crimping portion 31 of the terminal metal piece 3 and it is thereby possible to easily insert the compressed wire portion 21 between the pair of facing walls 311, 312. As shown in FIG. 10, in the state after the insertion step, the compressed wire portion 21 slightly protrudes from the facing region of the pair of facing walls 311, 312 on both sides in the extending direction of the solid wire 2.

In the state after the insertion step, the first small curvature surface 211 faces the first facing wall 311 and the second small curvature surface 212 faces the second facing wall 312, as shown in FIGS. 11 and 12. In addition, a gap is formed between the first small curvature surface 211 and the first facing wall 311.

In addition, on the solid wire 2, each of end portions 221, 231 of the pair of circular cross-sectional portion 22, 23 located close to each other and a pair of the inclined surfaces 24 are formed at positions overlapping the first facing wall 311 when viewed in the longitudinal direction of the compressed wire portion 21, as shown in FIGS. 11 and 12. Therefore, after the insertion step, movement of the solid wire 2 relative to the terminal metal piece 3 in the longitudinal direction of the compressed wire portion 21 is restricted since the inclined surfaces 24 of the solid wire 2 come into contact with the first facing wall 311.

As shown in FIG. 12, in the state after the insertion step, the tip 25 of the solid wire 2 is arranged at a position overlapping the flank surface 331 via a space in the facing direction of the pair of facing walls 311, 312. A burr may be formed on the tip of the solid wire 2 by, e.g., stamping, etc., but the burr can be prevented from coming into contact with the terminal metal piece 3 since the tip of the solid wire 2 and the flank surface 331 overlap via a space.

Figure 13:
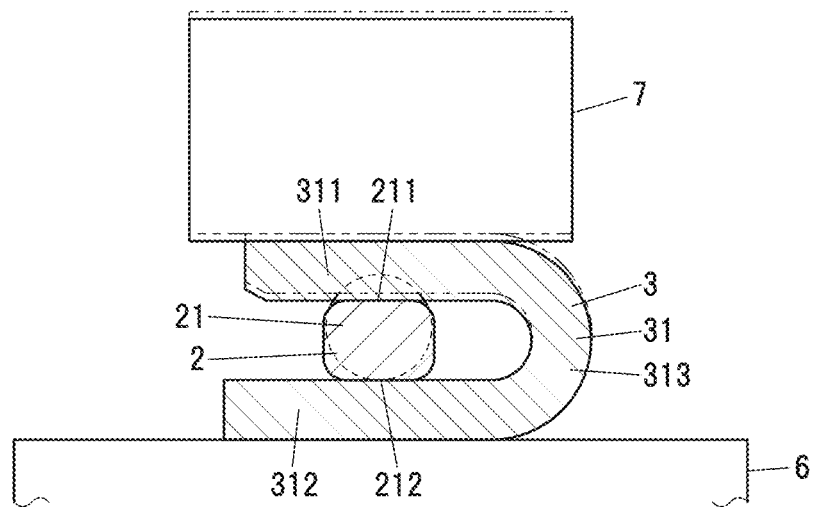
FIG. 13 is an explanatory diagram illustrating a crimping step in the first embodiment.

The crimping step is performed after the insertion step. FIG. 13 is an explanatory diagram illustrating the crimping step. In the crimping step, the solid wire crimping portion 31 with the solid wire 2 inserted thereinto is placed on a crimping table 6, and the first facing wall 311 is pressed by a crimping tool 7 toward the second facing wall 312 from a side of the solid wire crimping portion 31 opposite to the crimping table 6. The solid wire crimping portion 31 is thereby crimped to the compressed wire portion 21 of the solid wire 2. By the crimping step, the first facing wall 311 comes into surface contact with the first small curvature surface 211 and the second facing wall 312 comes into surface contact with the second small curvature surface 212, and the solid wire crimping portion 31 is crimped to the compressed wire portion 21.

Figure 14:
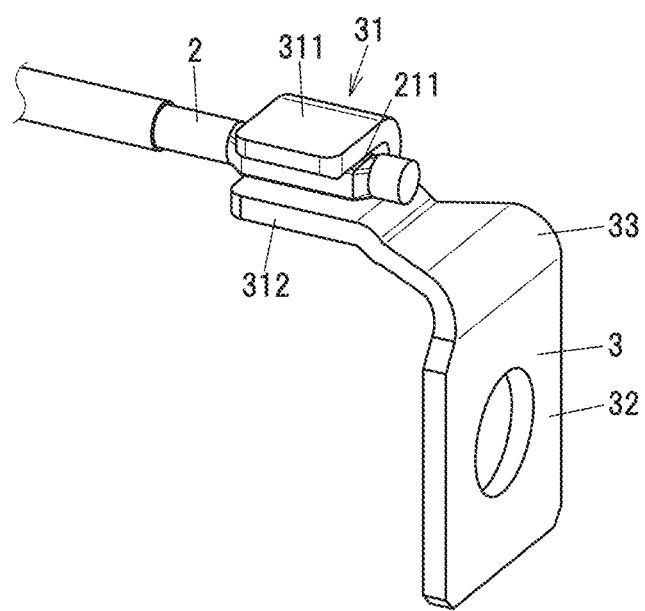
FIG. 14 is a perspective view showing the power distribution member after the crimping step in the first embodiment.
Figure 15:
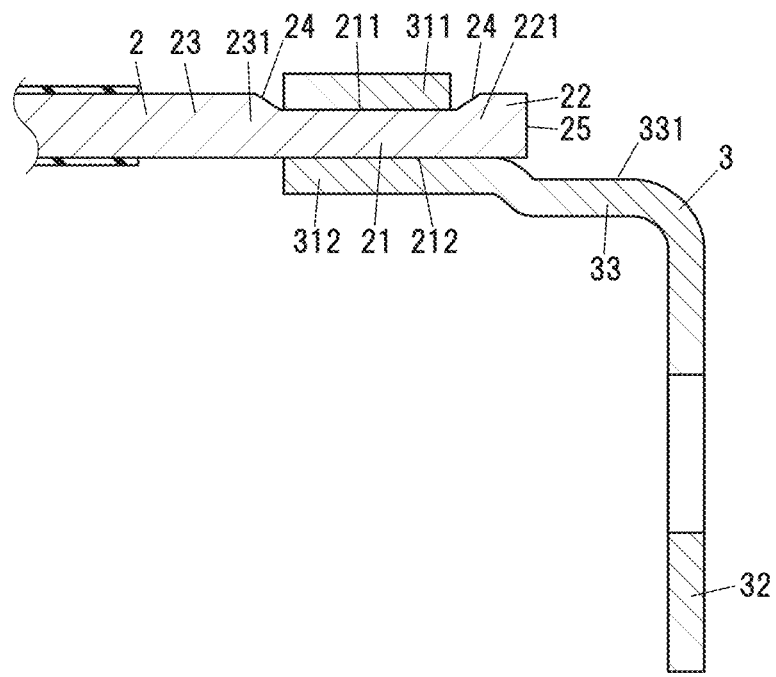
FIG. 15 is a cross-sectional view showing the power distribution member after the crimping step in the first embodiment.

FIG. 14 is a perspective view showing the power distribution member 1 after the crimping step. FIG. 15 is a cross-sectional view showing the power distribution member 1 after the crimping step. After the crimping step, the first small curvature surface 211 and the second small curvature surface 212 protruding from the facing region of the pair of facing walls 311, 312 are visible when viewed in the facing direction of the pair of facing walls 311, 312. That is, the first small curvature surface 211 and the second small curvature surface 212 protruding from the facing region of the pair of facing walls 311, 312 can be visible when the pressing step for the solid wire 2 is performed before the crimping step. In this regard, after the crimping step, a portion at which the pair of small curvature surfaces 211, 212 come close to each other may be slightly more depressed than before the crimping step, but the depression after the crimping step is not shown in FIG. 15.

In the crimping step, a current may be passed between the crimping tool 7 and the crimping table 6 through the solid wire 2 so that the first small curvature surface 211 of the solid wire 2 is welded to the first facing wall 311 and the second small curvature surface 212 to the second facing wall 312 by fusing. Alternatively, the solid wire crimping portion 31 may be fixed to the solid wire 2 only by crimping the solid wire crimping portion 31 to the solid wire 2 without performing fusing.

Then, a step of bending the entire solid wire 2 into a predetermined shape is performed according to the positions of the terminal block 13 and an end portion of the U-phase winding 121, the V-phase winding 122 or the W-phase winding 123 as shown in FIG. 1. A step of squashing an end portion of the solid wire 2 on the solid-wire proximal-end side into a flat rectangular shape is further performed, and the power distribution member 1 is thereby obtained.

Functions and Effects of the First Embodiment

In the method for manufacturing the power distribution member 1 in the first embodiment, the pair of small curvature surfaces 211, 212 are formed on the solid wire 2 beforehand by the pressing step, and after the pressing step, the pair of facing walls 311, 312 are crimped onto the solid wire 2 in the crimping step. Therefore, a contact area between the facing walls 311, 312 and the small curvature surfaces 211, 212 after the crimping step is easily increased since the facing walls 311, 312 and the small curvature surfaces 211, 212, which are substantially parallel to each other, are pressure-joined in the crimping step, hence, connection strength between the solid wire 2 and the terminal metal piece 3 is easily improved.

Figure 16:
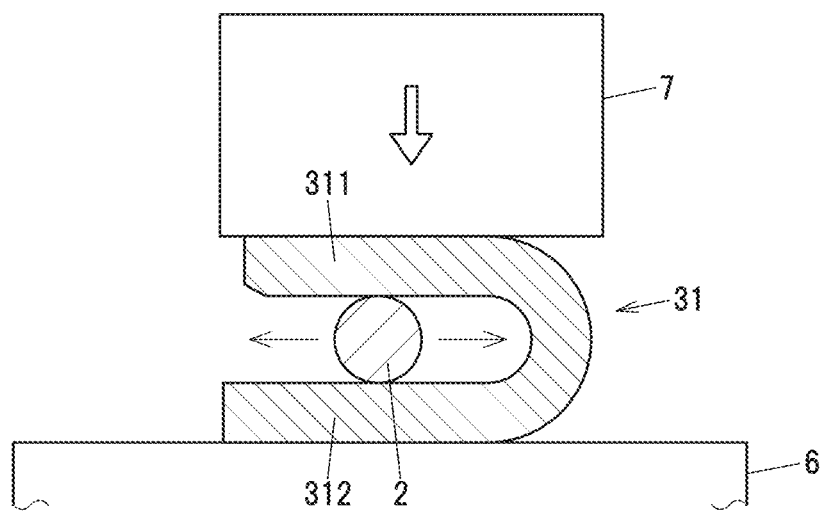
FIG. 16 is an explanatory diagram illustrating the crimping step in a comparative embodiment.

Now consider the case in which the solid wire crimping portion 31 is crimped to the solid wire 2 with a circular cross-sectional shape without performing the pressing step of the first embodiment, as in the method for manufacturing a power distribution member in the comparative embodiment shown in FIG. 16. In this case, the solid wire 2 is likely to be in substantially line contact with each of the pair of facing walls 311, 312, hence, the contact area between the facing walls 311, 312 and the solid wire 2 is small and connection strength between the solid wire 2 and the terminal metal piece 3 is likely to decrease.

Furthermore, in the method for manufacturing the power distribution member 1 in the comparative embodiment shown in FIG. 16, the respective flat facing surfaces of the pair of facing walls 311, 312 are pressed against the solid wire 2 with a circular cross-sectional shape in the crimping step. Therefore, the solid wire 2 may be shifted in any of directions orthogonal to the pressing direction (i.e., toward any of the sides indicated by the thin arrows in FIG. 16). In this case, e.g., the first facing wall 311 could be shifted diagonally relative to a plane perpendicular to the facing direction of the pair of facing walls 311, 312, causing a decrease in connection strength between the solid wire 2 and the terminal metal piece 3.

On the other hand, in the first embodiment, the pair of facing walls 311, 312 are pressed against the pair of small curvature surfaces 211, 212 of the solid wire 2 which are formed to face the facing walls 311, 312. This suppresses misalignment of the terminal metal piece 3 in a direction orthogonal to the pressing direction, resulting in that a decrease in connection strength between the solid wire 2 and the terminal metal piece 3 is suppressed.

In addition, the terminal metal piece 3 has the pair of facing walls 311, 312 facing each other and the coupling wall 313 coupling between ends of the pair of facing walls 311, 312, and is formed in a U-shape. Therefore, a load required to bring the pair of facing walls 311, 312 close to each other and to crimp the facing walls 311, 312 onto the solid wire 2 can be prevented from becoming excessively high in the crimping step, and this also can improve productivity of the power distribution member 1.

In addition, in the pressing step of the method for manufacturing the power distribution member 1 in the first embodiment, the pair of small curvature surfaces 211, 212 are formed at a position distant from the tip 25 of the solid wire 2. That is, on the solid wire 2, the pair of circular cross-sectional portion 22, 23 (i.e., portions of the solid wire 2 that are not pressed in the pressing step) are formed on both sides of the compressed wire portion 21 in the extending direction of the solid wire 2. Then, in the insertion step, the compressed wire portion 21 is inserted between the pair of facing walls 311, 312 through the first opening 301 by moving the solid wire 2 in a width direction of the small curvature surfaces 211, 212 (i.e., the width direction of the compressed wire portion 21). Therefore, it is easy to insert the solid wire 2 between the pair of facing walls 311, 312 in the insertion step. In addition, in the first embodiment, in the state after the insertion step and before the crimping step, each of the end portions 221, 231 of the pair of circular cross-sectional portion 22, 23 located close to each other is formed at a position overlapping the first facing wall 311 when viewed in the longitudinal direction of the compressed wire portion 21. Therefore, after the insertion step, it is possible to suppress misalignment between the solid wire 2 and the terminal metal piece 3 in the longitudinal direction of the compressed wire portion 21.

In addition, in the method for manufacturing the power distribution member 1 in the first embodiment, in the state after the pressing step and before the crimping step, the smallest distance I1 between the pair of facing walls 311, 312 is larger than the largest distance I2 between the pair of small curvature surfaces 211, 212 (the largest thickness of the compressed wire portion 21). Therefore, the compressed wire portion 21 can be easily inserted between the pair of facing walls 311, 312 in the insertion step.

As described above, according to the first embodiment, it is possible to provide a method for manufacturing a power distribution member capable of providing improved connection strength between a solid wire and a terminal metal piece, and also to provide a power distribution member.

Second Embodiment

In the second embodiment, the portion of the solid wire 2 pressed in the pressing step is changed from that in the first embodiment. Next, only features different from the first embodiment will be described. The rest of the configuration is the same as the first embodiment unless otherwise mentioned. In addition, of the reference signs used in the second embodiment onward, the same reference signs as those used in the already described embodiment represent the same constituent elements, etc., as those in the already described embodiment unless otherwise specified.

Figure 17:
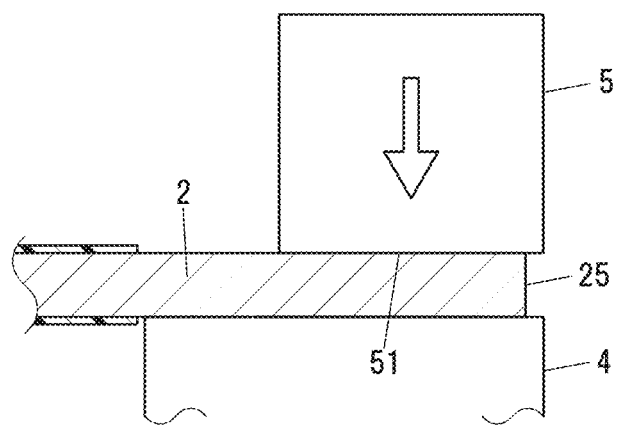
FIG. 17 is an explanatory diagram illustrating the pressing step in the second embodiment in a state before the solid wire is plastically deformed.
Figure 18:
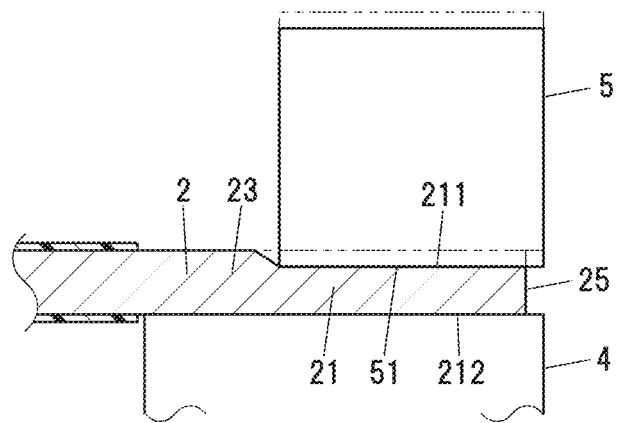
FIG. 18 is an explanatory diagram illustrating the pressing step in the second embodiment in a state after the solid wire is plastically deformed.

FIG. 17 is an explanatory diagram illustrating the pressing step in a state before the solid wire is plastically deformed. FIG. 18 is an explanatory diagram illustrating the pressing step in a state after the solid wire is plastically deformed. In the pressing step of the second embodiment, the pressing surface 51 of the pressing tool 5 presses a portion of the solid wire 2 including the tip 25 to plastically deform the solid wire 2. Thus, each of the pair of small curvature surfaces 211, 212 is formed to a position of the tip 25 of the solid wire 2. Accordingly, only the circular cross-sectional portion 23 and the inclined surface 24 on the solid-wire proximal-end side of the first small curvature surface 211 are formed on the solid wire 2.

Figure 19:
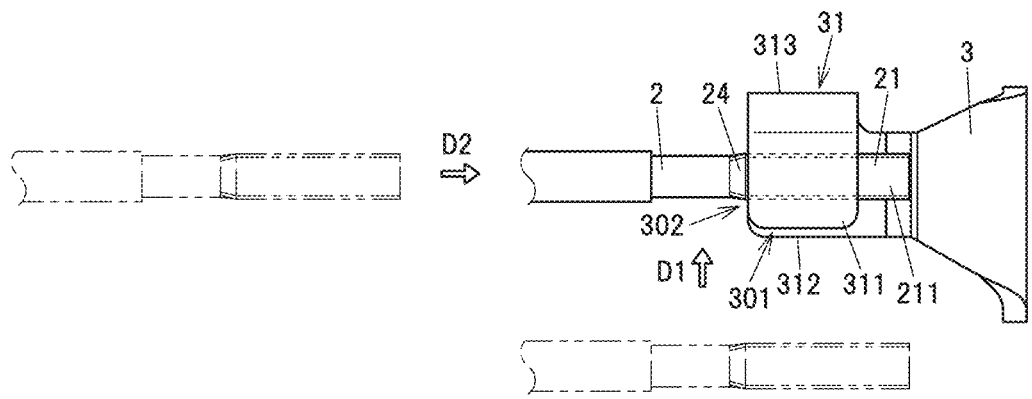
FIG. 19 is an explanatory plan view showing the solid wire and the terminal metal piece in the insertion step in the second embodiment.

FIG. 19 is an explanatory plan view showing the solid wire 2 and the terminal metal piece 3 in the insertion step. In the insertion step after the pressing step, it is possible to insert the solid wire 2 between the pair of facing walls 311, 312 of the terminal metal piece 3 through the first opening 301 by moving the solid wire 2 in a width direction D1 of the compressed wire portion 21, in the same manner as the first embodiment. In the second embodiment, it is also possible to insert the solid wire 2 between the pair of facing walls 311, 312 of the terminal metal piece 3 through the second opening 302 by moving the solid wire 2 in a longitudinal direction D2 of the compressed wire portion 21. That is, in the second embodiment, since the pair of small curvature surfaces 211, 212 are formed to the end of the solid wire 2 on the solid-wire distal-end side, it is possible to insert the compressed wire portion 21 between the pair of facing walls 311, 312 through either the first opening 301 or the second opening 302. In the insertion step, positioning of the solid wire 2 relative to the terminal metal piece 3 in the longitudinal direction of the compressed wire portion 21 can be done by, e.g., contact between the inclined surface 24 and the first facing wall 311.

Figure 20:
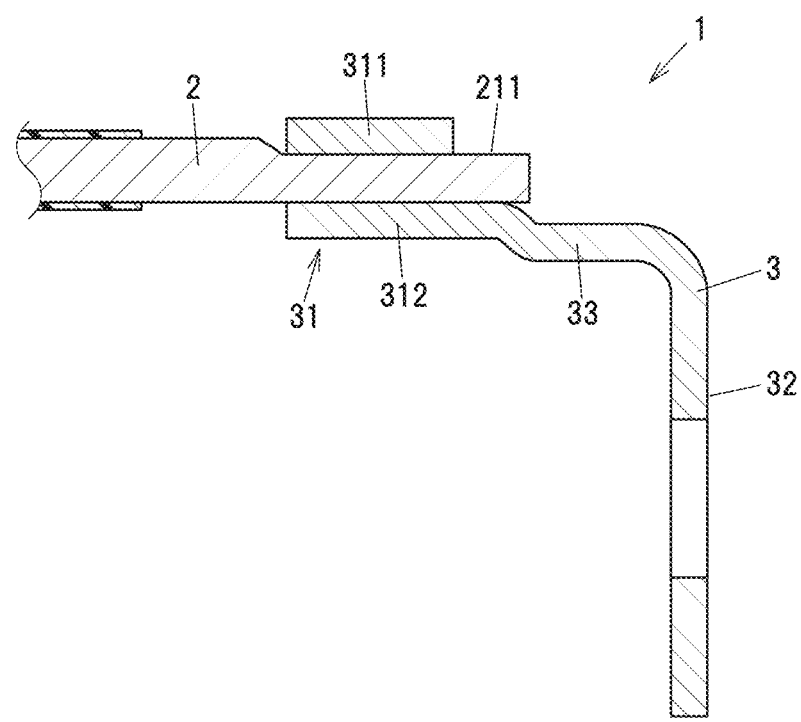
FIG. 20 is a cross-sectional view showing the power distribution member after the crimping step in the second embodiment.

FIG. 20 is a cross-sectional view showing the power distribution member 1 after the crimping step. After the insertion step, the crimping step is performed and the power distribution member 1 in the second embodiment is thereby obtained. The power distribution member 1 in the second embodiment is formed such that the first small curvature surface 211 protruding from the first facing wall 311 is visible when viewed in the normal direction to the first small curvature surface 211.

The rest of the configuration is the same as the first embodiment.

Functions and Effects of the Second Embodiment

In the method for manufacturing the power distribution member 1 in the second embodiment, the pair of small curvature surfaces 211, 212 are formed to a position of the end of the solid wire 2 on the solid-wire distal-end side. Therefore, the compressed wire portion 21 can be inserted between the pair of facing walls 311, 312 through either the first opening 301 or the second opening 302 in the insertion step, hence, productivity of the power distribution member 1 can be improved and degrees of freedom in production of the power distribution member 1 can also be increased.

Summary of the Embodiments

Technical ideas understood from the embodiments will be described below citing the reference signs, etc., used for the embodiments. However, each reference sign, etc., described below is not intended to limit the constituent elements in the claims to the members, etc., specifically described in the embodiments.

[1] A method for manufacturing a power distribution member (1), comprising: preparing a solid wire (2) with a circular cross-sectional shape; pressing to a portion of the solid wire (2) in a pressing direction orthogonal to the solid wire (2) to cause plastic deformation, thereby forming a pair of small curvature surfaces (211, 212) on an outer circumference of the solid wire (2) on both sides in the pressing direction, the small curvature surfaces (211, 212) having a smaller curvature than an outer circumferential surface of the solid wire (2) before the pressing and facing the pressing direction; preparing a terminal metal piece (3) that comprises a pair of facing walls (311, 312) facing each other and a coupling wall (313) coupling between ends of the pair of facing walls (311, 312); inserting the solid wire (2) after the pressing between the pair of facing walls (311, 312) of the terminal metal piece (3) in such a manner that one of the pair of small curvature surfaces (211, 212) faces one of the pair of facing walls (311, 312) and the other of the pair of small curvature surfaces (211, 212) faces the other of the pair of facing walls (311, 312); and after the inserting, crimping the pair of facing walls (311, 312) onto the solid wire (2).

[2] The method for manufacturing a power distribution member (1) defined by [1], wherein in the pressing, the pair of small curvature surfaces (211, 212) are formed at a position distant from a tip (25) of the solid wire (2), and wherein in the inserting, a compressed wire portion (21) is inserted between the pair of facing walls (311, 312) through an opening (301) provided between the pair of facing walls (311, 312) on a side opposite to the coupling wall (313) by moving the solid wire (2) in a width direction of the small curvature surfaces (211, 212), the compressed wire portion (21) being a portion of the solid wire (2) along an extending direction thereof on which the pair of small curvature surfaces (211, 212) are formed.

[3] The method for manufacturing a power distribution member (1) defined by [2], wherein the solid wire (2) in a state after the pressing has a pair of circular cross-sectional portions (22, 23) that are located on both sides of the pair of small curvature surfaces (211, 212) in the extending direction of the solid wire (2) and are not pressed by the pressing, and wherein in a state after the inserting and before the crimping, each of end portions (221, 231) of the circular cross-sectional portions (22, 23) located close to each other is formed at a position overlapping at least one of the pair of facing walls (311, 312) when viewed in a longitudinal direction of the compressed wire portion (21).

[4] The method for manufacturing a power distribution member (1) defined by [1], wherein in the pressing, the pair of small curvature surfaces (211, 212) are formed to a position of the tip (25) of the solid wire (2).

[5] The method for manufacturing a power distribution member (1) defined by any one of [1] to [4], wherein in a state after the pressing and before the crimping, a smallest distance (I1) between the pair of facing walls (311, 312) in a facing direction of the pair of facing walls (311, 312) is larger than a largest distance (I2) between the pair of small curvature surfaces (211, 212) in an alignment direction of the pair of small curvature surfaces (211, 212).

[6] A power distribution member (1), comprising: a solid wire (2) comprising a circular cross-sectional portion (22, 23) with a circular cross-sectional shape; and a terminal metal piece (3) crimped to the solid wire (2), wherein the terminal metal piece (3) comprises a pair of facing walls (311, 312) facing each other and sandwiching the solid wire (2), and a coupling wall (313) coupling between ends of the pair of facing walls (311, 312), wherein a pair of small curvature surfaces (211, 212) having a smaller curvature than an outer circumferential surface of the circular cross-sectional portion (22, 23) of the solid wire (2) and facing a facing direction of the pair of facing walls (311, 312) are formed on an outer circumference of the solid wire (2) on both sides in the facing direction, and wherein each of the pair of small curvature surfaces (211, 212) is arranged such that a portion is within a facing region of the facing walls (311, 312) and another portion is exposed from the facing region.

[7] The power distribution member (1) defined by [6], wherein the pair of small curvature surfaces (211, 212) are formed at a position distant from a tip (25) of the solid wire (2), wherein the solid wire (2) comprises a pair of the circular cross-sectional portions (22, 23) located on both sides of the pair of small curvature surfaces (211, 212) in an extending direction of the solid wire (2), and wherein each of end portions (221, 231) of the pair of the circular cross-sectional portions (22, 23) located close to each other is formed at a position overlapping at least one of the pair of facing walls (311, 312) when viewed in a longitudinal direction of the small curvature surfaces (211, 212).

[8] The power distribution member (1) defined by [6], wherein the pair of small curvature surfaces (211, 212) are formed to a position of the tip (25) of the solid wire (2).

Although the embodiments of the invention have been described, the invention according to claims is not to be limited to the embodiments described above. Further, please note that not all combinations of the features described in the embodiments are necessary to solve the problem of the invention. In addition, the invention can be appropriately modified and implemented without departing from the gist thereof.

The invention claimed is:

1. A method for manufacturing a power distribution member, comprising:
    preparing a solid wire with a circular cross-sectional shape;
    pressing to a portion of the solid wire in a pressing direction orthogonal to the solid wire to cause plastic deformation, thereby forming a pair of small curvature surfaces on an outer circumference of the solid wire on both sides in the pressing direction, the small curvature surfaces having a smaller curvature than an outer circumferential surface of the solid wire before the pressing and facing the pressing direction;
    preparing a terminal metal piece that comprises a pair of facing walls facing each other and a coupling wall coupling between ends of the pair of facing walls;
    inserting the solid wire after the pressing between the pair of facing walls of the terminal metal piece in such a manner that one of the pair of small curvature surfaces faces one of the pair of facing walls and the other of the pair of small curvature surfaces faces the other of the pair of facing walls; and
    after the inserting, crimping the pair of facing walls onto the solid wire.

2. The method according to claim 1, wherein in the pressing, the pair of small curvature surfaces are formed to a position of the tip of the solid wire.

3. The method according to claim 1, wherein in a state after the pressing and before the crimping, a smallest distance between the pair of facing walls in a facing direction of the pair of facing walls is larger than a largest distance between the pair of small curvature surfaces in an alignment direction of the pair of small curvature surfaces.

4. The method according to claim 1, wherein in the pressing, the pair of small curvature surfaces are formed at a position distant from a tip of the solid wire, and wherein in the inserting, a compressed wire portion is inserted between the pair of facing walls through an opening provided between the pair of facing walls on a side opposite to the coupling wall by moving the solid wire in a width direction of the small curvature surfaces, the compressed wire portion being a portion of the solid wire along an extending direction thereof on which the pair of small curvature surfaces are formed.

5. The method according to claim 4, wherein the solid wire in a state after the pressing has a pair of circular cross-sectional portions that are located on both sides of the pair of small curvature surfaces in the extending direction of the solid wire and are not pressed by the pressing, and wherein in a state after the inserting and before the crimping, each of end portions of the circular cross-sectional portions located close to each other is formed at a position overlapping at least one of the pair of facing walls when viewed in a longitudinal direction of the compressed wire portion.

6. A power distribution member, comprising:
    a solid wire comprising a circular cross-sectional portion with a circular cross-sectional shape; and
    a terminal metal piece crimped to the solid wire,
    wherein the terminal metal piece comprises a pair of facing walls facing each other and sandwiching the solid wire, and a coupling wall coupling between ends of the pair of facing walls,
    wherein a pair of small curvature surfaces having a smaller curvature than an outer circumferential surface of the circular cross-sectional portion of the solid wire and facing a facing direction of the pair of facing walls are formed on an outer circumference of the solid wire on both sides in the facing direction, and
    wherein each of the pair of small curvature surfaces is arranged such that a portion is within a facing region of the facing walls and another portion is exposed from the facing region.

7. The power distribution member according to claim 6, wherein the pair of small curvature surfaces are formed at a position distant from a tip of the solid wire, wherein the solid wire comprises a pair of the circular cross-sectional portions located on both sides of the pair of small curvature surfaces in an extending direction of the solid wire, and wherein each of end portions of the pair of the circular cross-sectional portions located close to each other is formed at a position overlapping at least one of the pair of facing walls when viewed in a longitudinal direction of the small curvature surfaces.

8. The power distribution member according to claim 6, wherein the pair of small curvature surfaces are formed to a position of the tip of the solid wire.

* * * * *